(12) United States Patent
Takemoto (10) Patent No.: US 10,031,220 B2
(45) Date of Patent: Jul. 24, 2018

(54) SHIP RADAR APPARATUS AND METHOD OF MEASURING VELOCITY (71) Applicant: Furuno Electric Co., Ltd., Nishinomiya (JP)

(72) Inventor: Sae Takemoto, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 593 days.

(21) Appl. No.: 14/429,755

(22) PCT Filed: Sep. 10, 2013

(86) PCT No.: PCT/JP2013/074312
§ 371 (c)(1),
(2) Date: Mar. 19, 2015

(87) PCT Pub. No.: WO2014/045930
PCT Pub. Date: Mar. 27, 2014

(65) Prior Publication Data
US 2015/0241557 A1 Aug. 27, 2015

(30) Foreign Application Priority Data

Sep. 20, 2012 (JP) ................................ 2012-207421

(51) Int. Cl.
*G01S 13/524* (2006.01)
*G01S 13/58* (2006.01)
(Continued)

(52) U.S. Cl.
CPC ........ *G01S 13/5242* (2013.01); *G01S 13/589* (2013.01); *G01S 13/60* (2013.01);
(Continued)

(58) Field of Classification Search
CPC .... G01S 13/5242; G01S 13/86; G01S 13/589; G01S 13/62; G01S 13/60; G01S 13/9307
(Continued)

(56) References Cited

U.S. PATENT DOCUMENTS 3,618,086 A * 11/1971 van Staaden ............. G01S 1/02
342/158
4,143,312 A * 3/1979 Duckworth ............. G12B 5/00
244/165
(Continued)

FOREIGN PATENT DOCUMENTS

GB 887646 A * 1/1962 ............. G01S 13/60
JP H05333144 A 12/1993
(Continued)

OTHER PUBLICATIONS

Zhang Boyan and Cai Qingyu, "A new method for electronic tracking beam stabilization," Proceedings of International Radar Conference, Beijing, 1996, pp. 507-510.*
(Continued)

*Primary Examiner* — Frank J McGue
(74) *Attorney, Agent, or Firm* — Alleman Hall Creasman & Tuttle LLP (57) ABSTRACT

Error that occurs when an absolute velocity of a target object is measured by using an antenna installed on a ship body that rocks and drifts in a complex manner since it floats on the sea is reduced. An antenna is installed on a ship body and transceives electromagnetic waves. A roll angle and a pitch angle of the ship body are detected by using an inclination sensor. An antenna velocity calculator calculates an antenna velocity of the antenna by using the detected roll and pitch angles of the ship body. An antenna velocity compensator compensates the antenna velocity of the antenna for a relative velocity between the ship body and a target object, the antenna velocity calculated by the antenna velocity
(Continued)

calculator, the relative velocity obtained based on reflection waves received by the antenna.

7 Claims, 7 Drawing Sheets

(51) Int. Cl.
    *G01S 13/60*     (2006.01)
    *G01S 13/62*     (2006.01)
    *G01S 13/86*     (2006.01)
    *G01S 13/93*     (2006.01)

(52) U.S. Cl.
    CPC .............. *G01S 13/62* (2013.01); *G01S 13/86* (2013.01); *G01S 13/9307* (2013.01)

(58) Field of Classification Search
    USPC ........................................................ 342/104
    See application file for complete search history.

(56) References Cited

U.S. PATENT DOCUMENTS

| | | | | |
|---|---|---|---|---|
| 4,515,013 A | * | 5/1985 | Hue | G01P 13/02 73/170.01 |
| 4,621,266 A | * | 11/1986 | Le Gall | H01Q 1/18 342/359 |
| 5,872,535 A | * | 2/1999 | Jordan | G01S 13/58 342/161 |
| 5,922,039 A | * | 7/1999 | Welch | H01Q 1/18 280/5.507 |
| 7,311,000 B2 | * | 12/2007 | Smith | G01S 17/58 73/170.11 |
| 2007/0090991 A1 | * | 4/2007 | Yoshikawa | G01S 13/589 342/70 |
| 2010/0289690 A1 | | 11/2010 | Dai | |

FOREIGN PATENT DOCUMENTS

| | | |
|---|---|---|
| JP | H1062527 A | 3/1998 |
| JP | H1194934 A | 4/1999 |
| JP | 2003161774 A | 6/2003 |
| JP | 2010266292 A | 11/2010 |
| JP | 2011215113 A | 10/2011 |

OTHER PUBLICATIONS

Machine translation of JP10-62527A (Year: 1998).*
Machine translation of JP2011-215113 (Year: 2011).*
ISA Japanese Patent Office, International Search Report Issued in Patent Application No. PCT/JP2013/074312, dated Oct. 15, 2013, WIPO, 4 pages.

* cited by examiner

SHIP RADAR APPARATUS AND METHOD OF MEASURING VELOCITY

TECHNICAL FIELD

This disclosure relates to a ship radar apparatus and a method of measuring a velocity, which perform velocity measurement by using an antenna installed in a ship, a float bridge, etc.

BACKGROUND ART

With radar apparatuses broadly adopted for ships, an antenna which rotates at a velocity of, for example, about 20 to 30 rpm, is installed on a ship body and used in detecting a target object existing around the ship body. Each radar apparatus transmits electromagnetic waves pulsed-modulated by the antenna, receives reflection waves reflected on the target object, and detects an azimuth and distance of the target object by using reception signals obtained from the reflection waves. Moreover, with such a radar apparatus, a measurement of a relative velocity between the target object and the ship body is performed by using the reflection waves from the target object received by the antenna.

With the radar apparatus installed in a movable body, such as a ship as above, a Doppler frequency caused by a movement of the movable body itself is generated, and therefore, a correction of error caused by the velocity of the ship or rocking/drifting of the ship is performed when measuring a ground velocity of the target object (an absolute velocity of the target object).

Figure 11:
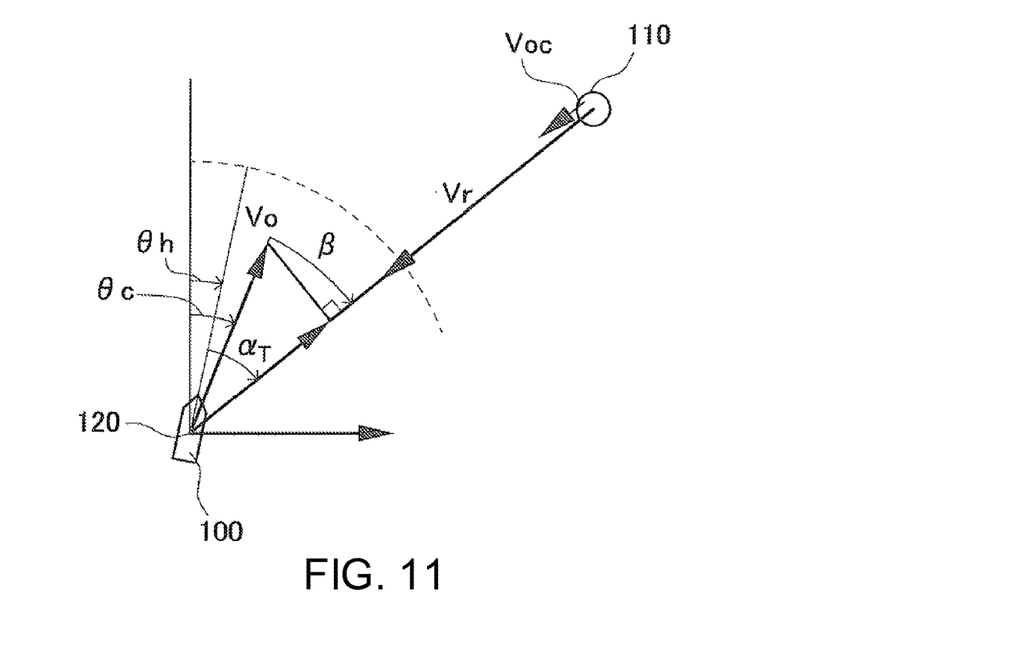
FIG. 11 is a conceptual view for describing a method of obtaining an absolute velocity of a target object.

FIG. 11 is a conceptual view for describing a method of calculating a ground velocity of a target object by correcting a velocity of a ship. A relative velocity Vr of a target object 110 in an azimuth direction with respect to a ship 100 is observed by a radar apparatus 120 installed in the ship 100.

Since the observation that can be performed by the radar apparatus 120 is for the relative velocity Vr of the target object 110, in order to obtain a ground velocity (absolute velocity) Voc of the target object 110 in the azimuth direction, for example, as described in Patent Document 1 (JPH05-333144A), an absolute velocity of the ship 100 installed with the radar apparatus 120 and a velocity caused by rocking/drifting of the ship 100 (hereinafter, simply referred to as the ship velocity) need to be subtracted. The velocity of the ship 100 is given as information of a position of the ship 100 which changes with time. The position and velocity of the ship 100 are given from other measuring instrument, such as a GPS (Global Positioning System), a LOG (ship velocity distance meter), or a gyrocompass.

Since the velocity Vo of the ship 100 is obtained regardless of the measurement of the relative velocity Vr by the radar apparatus 120 as above, the correction needs to be performed in consideration of the azimuth and the like of the target object 110 detected by the radar apparatus 120. A direction (course) of a vector of the velocity Vo of the ship 100 measured by the other measuring instrument has an angle $\beta$ with respect to the azimuth at which the target object 110 exists.

Therefore, the ground velocity Voc of the target object 110 is given based on the following equation: $Voc=Vr-Vo\times\cos\beta$.

The velocity Vo of the ship 100 does not match with a heading $\theta h$ of the ship 100. For example, there is a case where a course $\theta c$ of the ship 100 no longer matches with the heading $\theta h$ due to periodic current. On the other hand, an azimuth $\alpha_T$ of the antenna of the radar apparatus 120 is determined with reference to the heading $\theta h$ of the ship 100.

Therefore, the angle $\beta$ formed between the direction of the vector of the velocity Vo of the ship 100 and the azimuth of the target object 110 needs to be calculated by using the azimuth $\alpha_T$ of the antenna, as $\beta=\alpha_T-(\theta c-\theta h)$.

Therefore, the ground velocity Voc of the target object 110 to be obtained can be rewritten as the following equation: $Voc=Vr-Vo\times\cos(\alpha_T-(\theta c-\theta h))$.

DISCLOSURE OF THE INVENTION

Problems to be Solved by the Invention

In a case with the ship, the ground velocity Voc of the target object 110 calculated by the conventional radar apparatus 120 includes the error even after correcting the velocity of the ship 100 as described above.

The error which also remains in the case where the velocity caused by the velocity of the ship 100 is subtracted is described with reference to FIGS. 12 and 13. Motions of the ship 100 are considered to be motions of a rigid body having six degrees of freedom. Specifically, in FIG. 12, when three axes perpendicular to each other by having the center of gravity of the ship 100 as the origin are Sx, Sy and Sz, the motions include front-and-back drifting in the Sx directions indicated by the arrow Su, side-to-side drifting in the Sy directions indicated by the arrow Sw, up-and-down drifting in the Sz directions indicated by the arrow He, sideways rocking (rolling) of rotating about the Sx axis which is indicated by the arrow Ro, vertical rocking (pitching) of rotating about the Sy axis which is indicated by the arrow Pi, and bow rocking of rotating about the Sz axis which is indicated by the arrow Ya.

Figure 12:
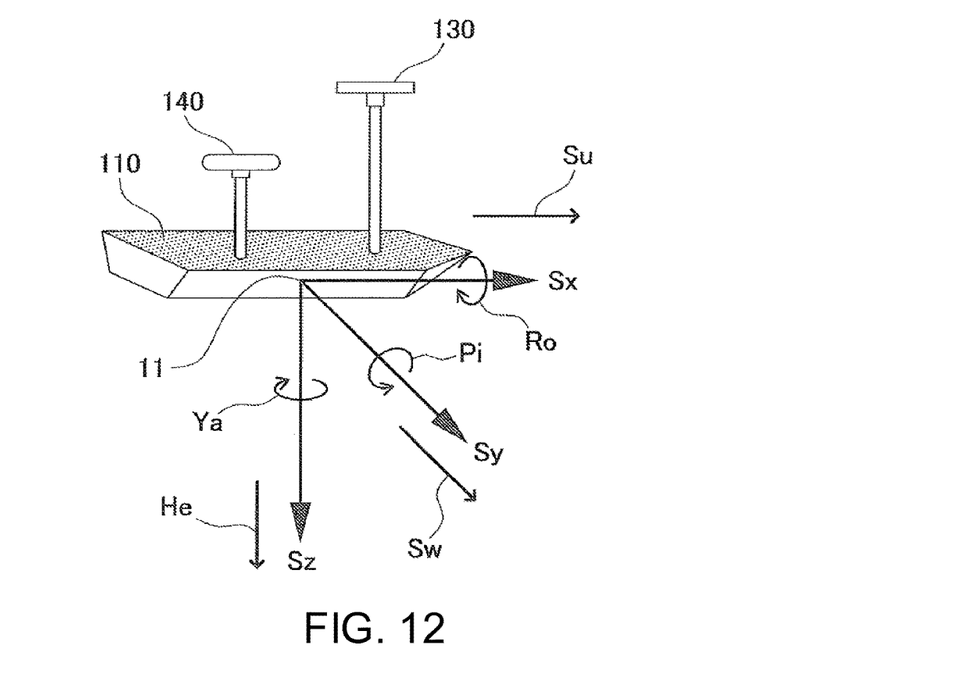
FIG. 12 is a perspective view for describing kinds of drifting and rocking of a ship.

Among the drifting and rocking indicated in FIG. 12, the up-and-down drifting indicated by the arrow He does not involve in the calculation of the ground velocity of the target object 110 since it does not have the component at the azimuth of the target object 110. Moreover, the front-and-back drifting and side-to-side drifting indicated by the arrow Su and the arrow Sw, respectively, are included in the velocity Vo of the ship 100 described above since they are captured as a change of the velocity of the ship 100 by the GPS or the like.

Since the velocity of the antenna 130 caused due to the rotations about the respective three Sx, Sy and Sz axes is not included in the velocity Vo of the ship 100 as above, even after the correction of the velocity Vo of the ship 100, the velocity of the antenna 130 is a cause of the error in calculating the ground velocity of the target object 110.

Figure 13:
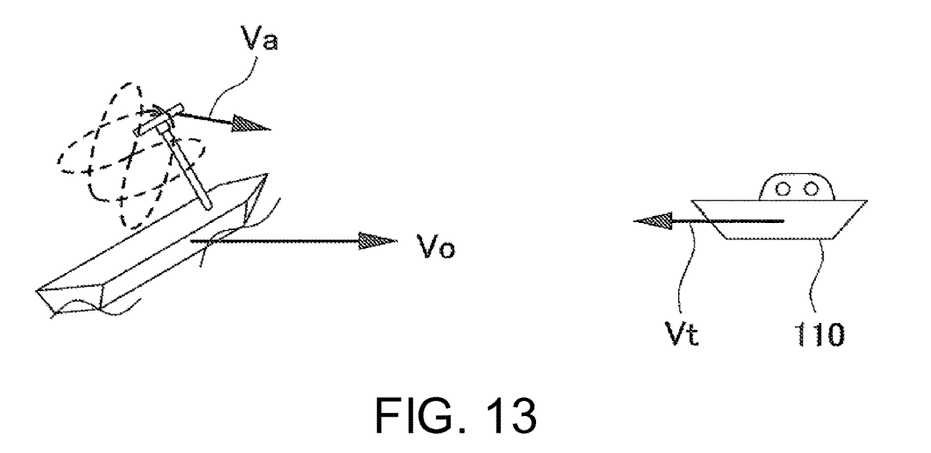
FIG. 13 is a conceptual view for describing a relationship of a relative velocity between the target object and the ship, with the velocity of the antenna.

For example, even if it is assumed, by only considering the rolling and the pitching, that the antenna 130 simply performs simple harmonic motion in the directions of the Sy and Sx axes, the antenna 130 rocks and drifts with many degrees of freedom, such as drawing a Lissajous curve as illustrated in FIG. 13, since the ship body floats on the sea. Therefore, the motions of the antenna 130 installed on the ship 100 become complicated.

This disclosure aims to reduce error when an absolute velocity of a target object is measured by using an antenna installed in the ship body that rocks and drifts in a complex manner since it floats on the sea.

SUMMARY OF THE INVENTION

For solving the above problems, a ship radar apparatus includes an antenna installed on a ship body and configured to transceive electromagnetic waves, a sensor configured to detect a roll angle and a pitch angle of the ship body, an antenna velocity calculating module configured to calculate an antenna velocity that is a velocity of the antenna with respect to the center of gravity of the ship body, by using the detected roll and pitch angles of the ship body, and an antenna velocity compensating module configured to compensate the calculated antenna velocity, for a relative velocity between a specific target object and the ship body, the relative velocity obtained by using reflection waves received by the antenna.

According to the ship radar apparatus, the compensation of the antenna velocity of the antenna caused by the roll and the pitch of the ship body can be performed. Therefore, error that occurs by the estimation of the relative velocity between the ship body and the specific target object based on the reflection waves received by the antenna can be reduced, the error caused since the antenna has the antenna velocity relative to the ship body due to the roll and the pitch among complicated rocking and drifting of the ship body.

Note that, the ship body referred here includes, not only a ship that moves with self-thrust, but also a float body that is simply moored, such as a float bridge.

For solving the above problems, a method of measuring a velocity includes detecting a roll angle and a pitch angle of a ship body. The method of measuring the velocity includes calculating an antenna velocity that is a velocity of the antenna with respect to the center of gravity of the ship body, by using the detected roll and pitch angles of the ship body, the antenna being installed on the ship body. The method of measuring the velocity includes compensating the calculated antenna velocity, on the basis of a relative velocity between the ship body and the target which is obtained by using reflection waves received by the antenna.

According to the method of measuring the velocity, the compensation of the antenna velocity of the antenna caused by the roll and the pitch of the ship body can be performed by the compensating the calculated antenna velocity. Therefore, the cause of error that occurs since the antenna has the antenna velocity relative to the ship body due to the roll and the pitch among complicated rocking and drifting of the ship body can be removed.

Effects of the Invention

According to this disclosure, even when the relative velocity between the ship body and the specific target object is measured by using the antenna installed on the ship body that rocks and drifts in a complex manner since the ship body floats on the sea, since the compensation of the antenna velocity of the antenna caused by the roll and the pitch of the ship body can be performed, the error that occurs in the estimation of the relative velocity between the ship body and the specific target object based on the reflection waves received by the antenna can be reduced.

MODE(S) FOR CARRYING OUT THE INVENTION

First Embodiment (1) Configuration of Radar Apparatus

Figure 1:
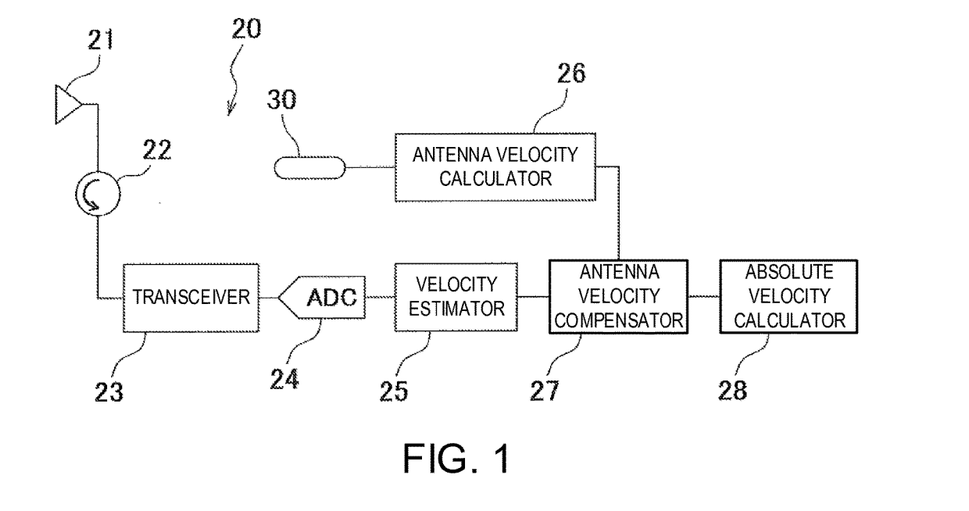
FIG. 1 is a block diagram illustrating a brief overview of a configuration of a ship radar apparatus according to a first embodiment.
Figure 2:
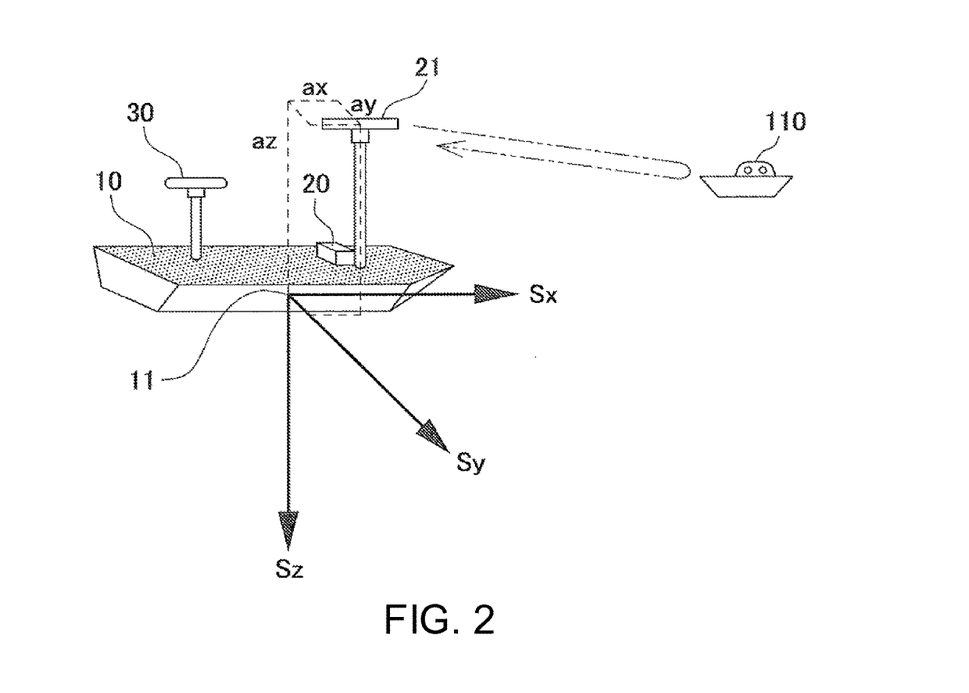
FIG. 2 is a perspective view for describing an installation position of an antenna of the ship radar apparatus.

An overall configuration of a radar apparatus according to a first embodiment of this disclosure is described with reference to the drawings. FIG. 1 is a block diagram illustrating a schematic configuration of the ship radar apparatus. As illustrated in FIG. 1, a ship radar apparatus 20 includes an antenna 21, a transception switch 22, a transceiver 23, an AD converter 24, a velocity estimator 25, an antenna velocity calculator 26, an antenna velocity compensator 27, and an absolute velocity calculator 28. As illustrated in FIG. 2, the ship radar apparatus 20 in FIG. 1 is a ship radar apparatus to be installed in a ship body 10 and configured to detect a target object 110, such as another ship on the sea. Such a ship radar apparatus 20 includes, not only a magnetron radar apparatus using a magnetron for its transmitter, but also a solid state radar apparatus using a semiconductor amplifier for its transmitter.

(Antenna 21)

In the ship radar apparatus 20, the antenna 21 transmits beams of pulsed radio waves (radar transmission signals) having sharp directivity and receives reflection waves from a certain target object existing around the antenna 21. The beam width is designed to be 2 degrees, for example. As illustrated in FIG. 2, the antenna 21 is installed on the ship body 10 and repeats the transmission and reception described above while rotating on the horizontal plane. The rotational speed is 24 rpm, for example. A unit of processing performed while the antenna 21 rotates once is referred to as a single scan. Moreover, the operation of transmission and reception in a period from transmission of a radar transmission signal until immediately before the next raider transmission signal is transmitted is referred to as a sweep. A time length of a single sweep, in other words a transmission cycle, is 1 ms, for example. A height of a position where the antenna 21 is installed, although may vary depending on the ship, can be considered to be within a range between a few meters and a few dozen meters.

(Transception Switch 22)

The transception switch 22 is configured to be connectable with the antenna 21 and switches the signal between the antenna 21 and the transceiver 23. In other words, the transception switch 22 prevents the radar transmission signal from straying into a reception circuit of the transceiver 23 in transmission, and prevents the radar reception signal from straying into a transmission circuit of the transceiver 23 in reception. As the transception switch 22, an electronic component, such as a circulator, is used.

(Transceiver 23)

The transceiver 23 generates the radar transmission signal and sends it out to the antenna 21 via the transception switch 22. The radar transmission signal is a signal frequency-converted by being mixed with a local signal outputted from a local oscillator. Moreover, the transceiver 23 receives the radar reception signal via the transception switch 22 from the antenna 21, converts the frequency of the radar reception signal into an intermediate frequency by mixing it with the local signal outputted from the local oscillator, and outputs it, after quadrature detection, to the AD converter 24 at the post stage. Specifically, the transceiver 23 generates, from the radar reception signal, an I (In-Phase) signal and a Q (Quadrature) signal of which phase is different from that of the I signal by $\pi/2$. Here, the I and Q signals are a real-number part and an imaginary-number part of a complex envelope signal Z of the radar reception signal, respectively.

(AD Converter 24)

The AD converter 24 samples the reception signal outputted from the transceiver 23 at a predetermined sampling frequency, and converts it into a digital signal. Normally, a ship radar image is displayed in a bird's eye view centering on a position of the ship radar apparatus (antenna 21). The origin of the display corresponds to the position of the ship radar apparatus 20. An operator of the radar apparatus 20 can recognize an azimuth and distance of the target object based on positions where amplitudes of reflection waves (target object signals) from the target object are displayed in the radar image.

Thus, the radar reception signals obtained in a single scan have information of the azimuth and distance. When the number of sweeps in a single scan is K, with reference to the first sweep (defined as zero degree), the radar reception signal obtained in the k-th sweep is obtained from a reflective body at the azimuth of $(k/K) \times 360$ (deg) ($0 \le k \le K-1$). The data obtained from the same azimuth is associated with the same azimuth number. The reception data obtained in the k-th sweep is given an azimuth number k.

Moreover, when the number of samples per single sweep is N and a sample range (longest displaying distance of which origin is the antenna 21) is L, the reception data obtained in the n-th sampling of each sweep is data obtained from a reflective body at a distance of $(n/N) \times L$ ($0 \le n \le N-1$). Such reception data obtained in the n-th sampling is given a distance number n. Hereinafter, the complex envelope signal Z is handled as a two-dimensional array regarding the azimuth number k and the distance number n, and the array is expressed with $Z[k, n]$.

(Velocity Estimator 25)

The velocity estimator 25 has, although the illustration is omitted, a memory configured to store, as the reception data, the digital signal outputted from the AD converter 24. The velocity estimator 25 estimates a relative velocity of the target object 110 with reference to the ship body 10, in a self-correlation method using the reception data from a plurality of sweeps stored in the memory. The estimation of the relative velocity in the self-correction method performed by the velocity estimator 25 is described later in detail.

(Antenna Velocity Calculator 26)

The antenna velocity calculator 26 acquires a roll angle and a pitch angle from an inclination sensor 30 provided to the ship body 10. In consideration of the height at which the antenna 21 is installed and the position of a center of gravity 11 of the ship body 10, the antenna velocity calculator 26 calculates a relative velocity of the antenna 21 caused by the antenna 21 moving with respect to the ship body 10, based on changes of the roll angle and the pitch angle. Hereinafter, a velocity of the antenna 21 with respect to the center of gravity of the ship body 10 is referred to as the antenna velocity. The calculation of the velocity of the antenna 21 is described later in detail.

(Antenna Velocity Compensator 27)

The antenna velocity compensator 27 obtains a direction component of the target object 110 based on the antenna velocity of the antenna 21 calculated by the antenna velocity calculator 26, and subtracts the antenna velocity of the antenna 21 from the relative velocity of the target object 110 estimated by the velocity estimator 25. Thus, in the antenna velocity compensator 27, the antenna velocity of the antenna 21 is compensated for the relative velocity estimated by the velocity estimator 25. The calculation of the velocity compensation is described later subsequently to the description of the calculation of the antenna velocity of the antenna 21.

(Absolute Velocity Calculator 28)

The absolute velocity calculator 28 acquires the position and velocity of the ship body 10 from other measuring instrument, such as a GPS, a LOG, or a gyrocompass. The absolute velocity calculator 28 calculates a ground velocity (absolute velocity) of the target object 110 by subtracting the acquired velocity of the ship body 10 from the relative velocity for which the compensation is completed by the antenna velocity compensator 27.

(2) Estimation of Relative Velocity

Figure 3:
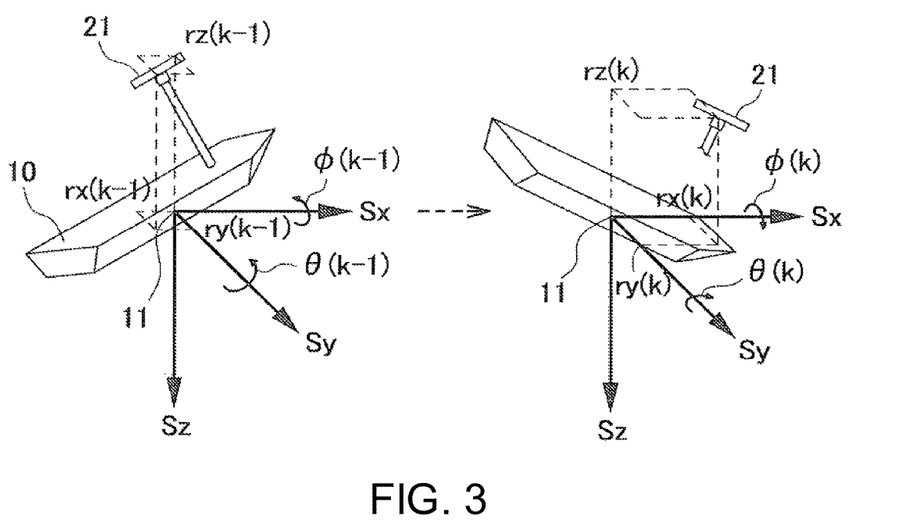
FIG. 3 shows views for describing a velocity of the antenna caused by roll and pitch, respectively.

Here, the estimation of the relative velocity performed by the velocity estimator 25 is described with reference to FIG. 3. It is assumed that the target object 110 approaches the ship body 10 at the velocity v. The distance number corresponding to the distance of the target object 110 is $n_0$, and the azimuth number of the azimuth of the first reflection wave among the reflection waves from the target object 110 is $k_0$. Moreover, it is assumed that the reflection waves from the target object 110 are received at azimuths between the azimuth number $k_0$ and an azimuth number $(k_0+M-1)$. Here, the velocity v of the target object 110 is estimated by using the following reception data of which total number is M, the following reception data being stored in the memory of the velocity estimator 25. The reception data S of which total number is M and which is to be used in the estimation is $S[k_0, n_0], S[k_0+1, n_0], S[k_0+2, n_0], \ldots, S[k_0+M-1, n_0]$.

$$Z[m] = S[k_0+m, n_0] \quad (0 \le m \le M-1) \quad (1)$$

In this manner, when the transmission central frequency of the radar transmission signal is expressed by $f_0$, the velocity of light is expressed by c, a conjugate complex number of a complex number $z[m]$ is expressed by $z^*[m]$, and an argument of the complex number $z[m]$ is expressed by $\arg[z[m]]$, the velocity v of the target object 110 is given by Equation 2.

$$v = \frac{C}{4\pi f_0 T} \cdot \frac{1}{\Delta m} \arg\left[\sum_{m=0}^{L-1} Z^*[m] - Z[m^+ \Delta m]\right] \quad (2)$$

Note that, $\Delta m$ and L are any natural numbers satisfying the relationship of $\Delta m + L \le M$.

(3) Estimation of Velocity of Antenna

An installation position A of the antenna 21 when the center of gravity 11 of the ship body 10 is fixed to the origin of the quadrature coordinates Sx, Sy and Sz in a state where the roll angle and the pitch angle are both zero, is defined by Equation 3. In other words, the Sz axis is taken in the vertical direction, the Sx axis is taken in the heading on the horizontal plane, and the Sy axis is taken in the left-and-right directions on the horizontal plane perpendicular to the Sz axes. Note that, the vertically downward direction of the Sz axis is positive, and therefore, az is normally a negative value.

$$A = \begin{pmatrix} ax \\ ay \\ az \end{pmatrix} \quad (3)$$

Numbers sequentially assigned to the measurements of the roll angle and the pitch angle which are performed discretely are referred to as the measurement numbers. The measurement performed after time lapse of t(k) from the measurement number k−1 is the measurement with the measurement number k. Here, an antenna position R(k) at the measurement number k is defined by Equation 4.

$$R(k) = \begin{pmatrix} rx(k) \\ ry(k) \\ rz(k) \end{pmatrix} \quad (4)$$

The antenna position R(k) is changed by the roll and the pitch. The state at the measurement number k−1 is illustrated on the left side of the arrow indicated by the dashed line in FIG. 3, and the state at the measurement number k is illustrated on the right side of the arrow indicated by the dashed line in FIG. 3. The roll angles at the measurement numbers k−1 and k are respectively indicated as φ(k−1) and φ(k), and the pitch angles are respectively indicated as θ(k−1) and θ(k).

When the rotational coordinate transformation matrix for the roll is defined as Φ(φ(k)) and the rotational coordinate transformation matrix for the pitch is defined as Θ(θ(k)), the antenna position R(k) is given by Equation 5.

$$R(k) = \Theta(\theta(k)) \cdot \Phi(\phi(k)) \cdot A \quad (5)$$

Here, the rotational coordinate transformation matrixes Φ(φ(k)) and Θ(θ(k)) become as Equations 6 and 7, respectively.

$$\phi(\phi(k)) = \begin{pmatrix} 1 & 0 & 0 \\ 0 & \cos\phi(k) & -\sin\phi(k0) \\ 0 & \sin\phi(k) & \cos\phi(k) \end{pmatrix} \quad (6)$$

$$\Theta(\theta(k)) = \begin{pmatrix} \cos\theta(k) & 0 & \sin\theta(k) \\ 0 & 1 & 0 \\ -\sin\theta(k) & 0 & \cos\theta(k) \end{pmatrix} \quad (7)$$

A velocity v(k) of the antenna 21 from the measurement timing of the measurement number k−1 until the measurement timing of the measurement number k is given by Equation 8.

$$v(k) = \frac{R(k) - R(k-1)}{t(k)} \quad (8)$$

t(k): Measurement time interval at measurement numbers k−1 to k

Since the velocity v(k) is three-dimensional vectors, it is expressed as Equation 9 by taking the respective components in Sx, Sy and Sz into consideration.

$$v(k) = \begin{pmatrix} vx(k) \\ vy(k) \\ vz(k) \end{pmatrix} \quad (9)$$

Figure 4:
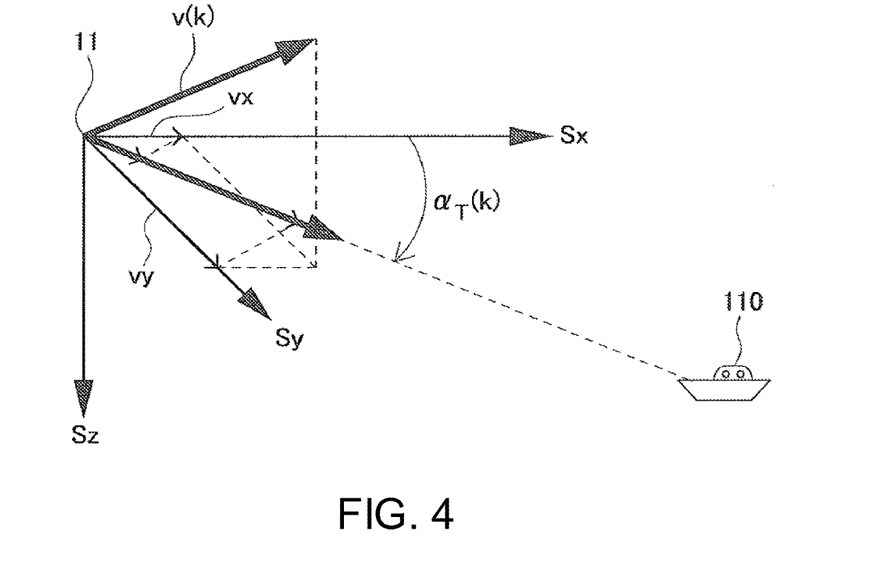
FIG. 4 is a conceptual view for describing compensation of the velocity of the antenna.

To compensate the antenna velocity of the antenna 21, it is required to obtain the velocity component of the antenna 21 at an azimuth (the rotational angle of the antenna 21 with respect to the heading) $\alpha_T(k)$ of the target object 110 at the measurement number k. In the antenna velocity of the antenna 21, as indicated in Equation 10, a component $avc_T(k)$ at the azimuth $\alpha_T(k)$ of the target object 110 is a sum of a direction component of vx(k) at the azimuth $\alpha_T(k)$ and a direction component of vy(k) at the azimuth $\alpha_T(k)$ (see FIG. 4).

$$avc_T(k) = vx(k) \cdot \cos(\alpha_T(k)) + vy(k) \cdot \sin(\alpha_T(k)) \quad (10)$$

The relative velocity of the target object 110 is corrected at the antenna velocity compensator 27, by subtracting the component $avc_T(k)$ of the antenna velocity of the antenna 21 at the azimuth $\alpha_T(k)$ from the relative velocity of the target object 110.

<Characteristics>

(1) In the ship radar apparatus 20, the antenna velocity of the antenna 21 caused by the roll and the pitch of the ship body 10 is calculated by the antenna velocity calculator 26. The antenna velocity compensator 27 compensates, for the relative velocity of the target object 110, the antenna velocity of the antenna 21 calculated by the antenna velocity calculator 26. Thus, the cause of error occurred in the relative velocity of the target object 110 that is acquired by the ship radar apparatus 20 through using the antenna 21 can be removed, the error caused due to the antenna 21 having the velocity relative to the ship body 10 because of the roll and the pitch among the complicated drifting and rocking of the ship body 10.

For example, because the velocity estimator 25 configured to be measurable of a relative velocity of a fixed target object at about 1 kn when the ground velocity of the ship body 10 is zero (when the ship is moored) is provided, the compensation by the antenna velocity compensator 27 is effective in a case where a property of the ship body 10, the equipped position of the antenna 21, and the state of the sea cause the value of the component $avc_T(k)$ to be about 1 kn.

Figure 5:
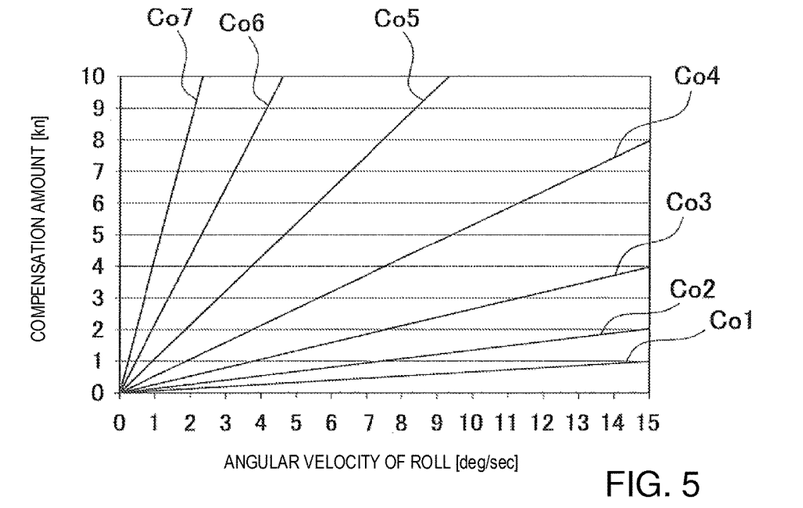
FIG. 5 is a flowchart for describing a velocity measuring method.

To simplify the calculation, FIG. 5 is obtained by estimating the component $avc_T(k)$ of the antenna velocity of the antenna 21 at the azimuth $\alpha_T(k)$ under assumption that the rocking/drifting only corresponds to the roll, the antenna 21 is equipped right above the center of gravity 11 of the ship body 10, and the target object 110 is on the Sy axis. The straight lines Co1, Co2, Co3, Co4, Co5, Co6 and Co1 illustrated in FIG. 5 indicate calculation results obtained when an angular velocity in the roll is changed with the height az of the antenna 21 designed to be 4 m, 8 m, 16 m, 32 m, 64 m and 128 m. For example, when the angular velocity in the roll is 10 [deg/sec] and the height of the antenna 21 is 4 m, the component $avc_T(k)$ is 1 kn or larger. Obviously, the component $avc_T(k)$ becomes a larger value when the pitch is taken into consideration, and therefore, it can be understood that the compensation of the antenna velocity of the antenna 21 in the ship is effective. Even if the situation allows to ignore the error, if there is only either one of the roll and the pitch, in the situation where the roll and pitch occur simultaneously, the error which is caused by the antenna 21 having the relative velocity with respect to the ship body 10 cannot be ignored, and a situation where the correction of the absolute velocity of the target object 110 is required increases.

<Modification 1-1>

With the radar apparatus 20 of the first embodiment, the example of the case where the antenna velocity calculator 26 and the antenna velocity compensator 27 are configured with hardware is described; however, the functions of the antenna velocity calculator 26 and the antenna velocity compensator 27 may be achieved by software. In this case, a controller, such as a CPU, into which programs are read from a memory medium, such a ROM, can achieve the functions of the antenna velocity calculator 26 and the antenna velocity compensator 27 (e.g., a series of processing stages illustrated in FIG. 6).

Figure 6:
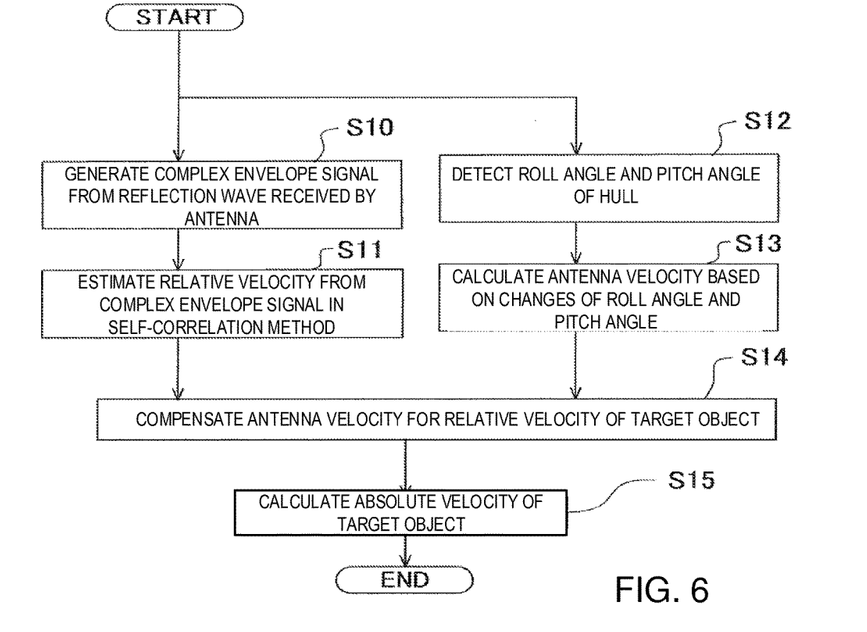
FIG. 6 is a chart for describing estimation of a compensation amount.

First, at Step S10, a complex envelope signal is generated from the reflection wave received by the antenna 21, via the transceiver 23. Further, at Step S11, the relative velocity of the target object 110 is estimated based on the complex envelope signal in the self-correlation method by the velocity estimator 25. On the other hand, in parallel to the processing at Steps S10 and S11, Steps S12 and S13 are performed.

At Step S12, the roll angle and the pitch angle of the ship body 10 are detected by the inclination sensor 30. Next, at Step S13 (antenna velocity calculation), an instant velocity of the antenna 21 is calculated by the antenna velocity calculator 26, based on the changes of the roll angle and the pitch angle.

At Step S14 (antenna velocity compensation), the antenna velocity of the antenna 21 calculated at Step S13 is compensated by the antenna velocity compensator 27, for the relative velocity estimated at Step S11. Further, by using the relative velocity on which the compensation of the antenna velocity is performed at Step S14, the absolute velocity of the target object 110 is calculated by the absolute velocity calculator 28 at Step S15.

Second Embodiment

With the radar apparatus 20 of the first embodiment, the example is described, in which the calculation of the antenna velocity of the antenna 21 is performed by the antenna velocity calculator 26 through directly using the value acquired from the inclination sensor 30. However, when the calculation of the antenna velocity of the antenna 21 is performed through directly using the value acquired from the inclination sensor 30, a disadvantage may occur, such as the antenna velocity of the antenna 21 calculated by the antenna velocity calculator 26 diverges. For example, the divergence of the antenna velocity of the antenna 21 may occur when a frequency of either one of data acquisition and data update of the roll angle or the pitch angle by the inclination sensor 30 is less than a frequency of the velocity estimation by the velocity estimator 25. Moreover, the disadvantage described above may also occur when the detection accuracy of either one of the roll angle and the pitch angle by the inclination sensor 30 is poor.

Particularly, the relative velocity obtained by the velocity estimator 25 through using the self-correlation method is an instant velocity of the target object 110. Therefore, the antenna velocity of the antenna 21 obtained by the antenna velocity calculator 26 is also an instant velocity. The inclination sensor 30 is not provided only for the measurement of the inclination of the antenna 21 in many cases, and it is difficult to synchronize it with the estimation of the velocity performed by the velocity estimator 25.

Figure 7:
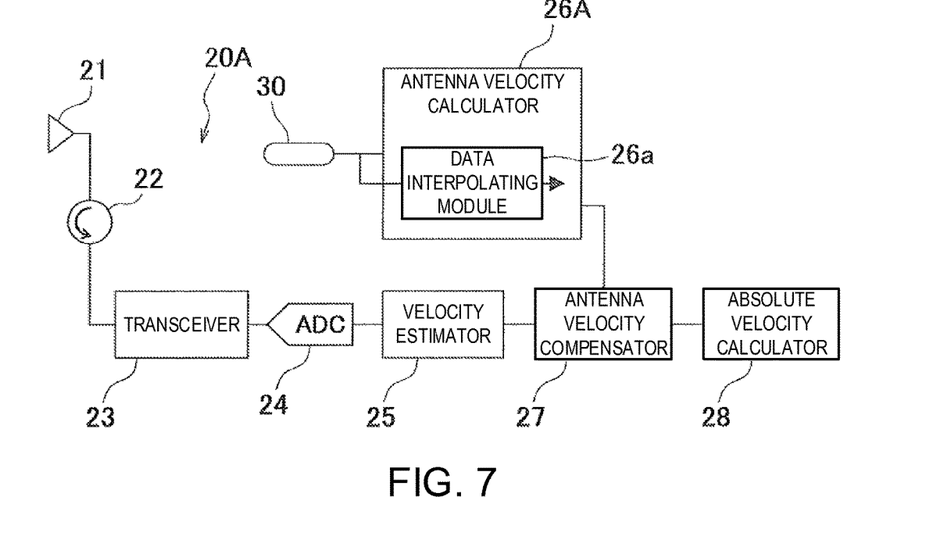
FIG. 7 is a block diagram illustrating a brief overview of a configuration of a ship radar apparatus according to a second embodiment.
Figure 8:
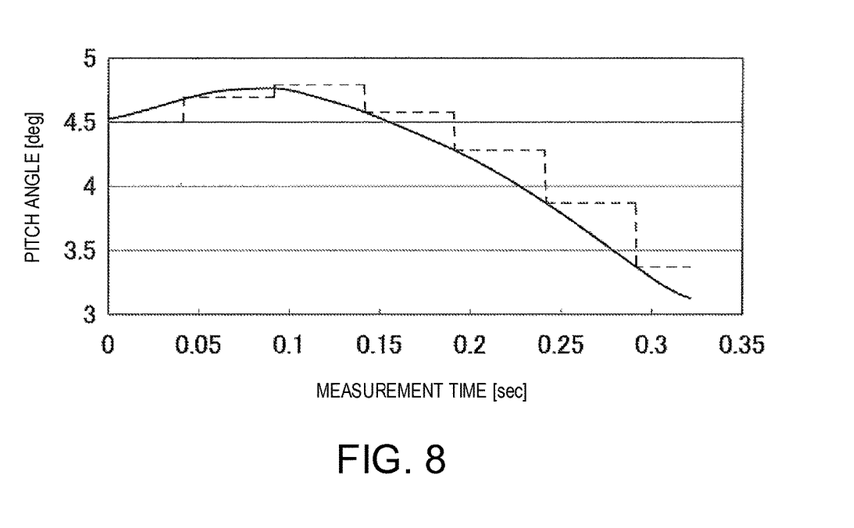
FIG. 8 is a chart for describing interpolation of data of an inclination sensor.

Thus, as illustrated in FIG. 7, a radar apparatus 20A according to a second embodiment of this disclosure includes a data interpolating module 26a in an antenna velocity calculator 26A. The data interpolating module 26a linearly interpolates the data of the roll angle and the pitch angle which is obtained intermittently, and generates curve lines in which the change is continuous over time. The curve line in which the change is continuous over time, which is indicated by the solid line in FIG. 8, is generated in the data interpolating module 26a by linearly interpolating the data of the pitch angle which is obtained intermittently. The data indicated by the dashed line in FIG. 8 is the data of the pitch angle obtained intermittently from the inclination sensor 30. Similarly for the roll angle, the linear interpolation of the data of the roll angle obtained intermittently from the inclination sensor 30 is performed by the data interpolating module 26a.

In the case where the calculation of the antenna velocity of the antenna 21 by the antenna velocity calculator 26A is performed using the continuously curvy line indicated by the solid line in FIG. 8, it can be prevented that the velocity compensation of the antenna 21 becomes zero at a fixed angle or the compensation amount becomes extremely large only when the angle changes.

<Modification 2-1>

With the radar apparatus 20A of the second embodiment, the example of the case where the antenna velocity calculator 26A and the antenna velocity compensator 27 are configured with hardware is described; however, the functions of the antenna velocity calculator 26A and the antenna velocity compensator 27 may be achieved by software. In this case, at Step S13 of the velocity measuring method illustrated in FIG. 6 in the first embodiment, the antenna velocity of the antenna 21 is calculated based on the changes of the roll angle and the pitch angle after the linear interpolations of the data of the roll angle and the pitch angle is performed.

Third Embodiment

In the first embodiment, the example is described, in which the calculation of the antenna velocity of the antenna 21 is performed by the antenna velocity calculator 26 while using the data acquired from the inclination sensor 30 as appropriate data all the time. However, the data acquired from the inclination sensor 30 is not necessarily always appropriate. A configuration may be adopted, in which the compensation of the velocity by the antenna velocity compensator 27 is suspended or canceled when the data acquired from the inclination sensor 30 is inappropriate.

Figure 9:
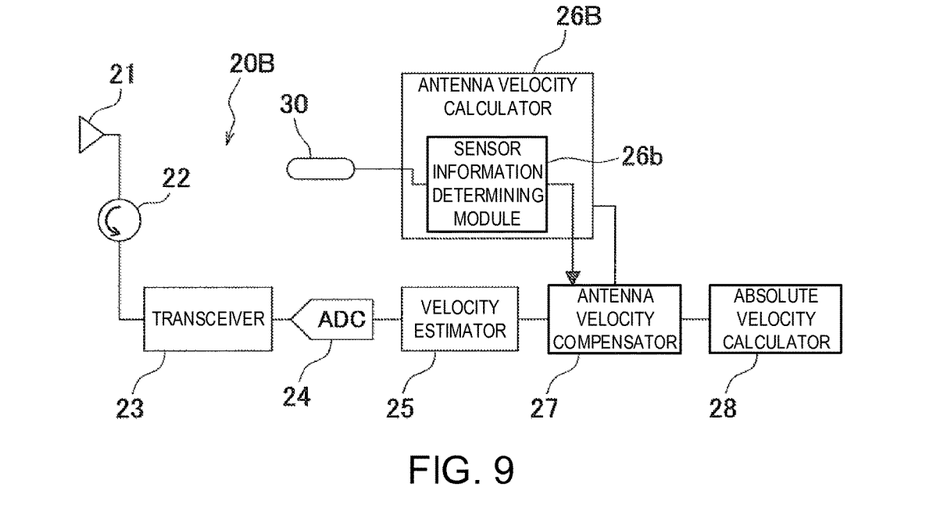
FIG. 9 is a block diagram illustrating a brief overview of a configuration of a ship radar apparatus according to a third embodiment.

For this, with a radar apparatus 20B according to a third embodiment of this disclosure, an antenna velocity calculator 26B has a function to determine whether the data acquired from the inclination sensor 30 is appropriate or inappropriate. Therefore, as illustrated in FIG. 9, the antenna velocity calculator 26B has a sensor information determining module 26b. For example, the cycle of lateral rocking of a fish boat is different generally depending on the gross tonnage of the fish boat. According to a certain measurement data, the cycle is 5 to 6 seconds with the fish boat of the gross tonnage of about 20 tons, whereas the cycle becomes 8 to 9 seconds with the fish boat of the gross tonnage of about 150 tons. Either one of an inappropriate cycle of the lateral rocking and an inappropriate inclination angle of the ship body 10 may be determined beforehand based on either one of the cycle of particular rocking/drifting of the ship body 10 and a limit inclination angle thereof.

The sensor information determining module 26b of the antenna velocity calculator 26B determines that the data of the inclination sensor 30 is inappropriate when the data is out of the either one of the predetermined cycle and the inclination angle range determined beforehand. When the sensor information determining module 26b determines that the data of the inclination sensor 30 is inappropriate, the antenna velocity calculator 26B requests the antenna velocity compensator 27 to suspend the compensation. Alternatively, the antenna velocity calculator 26B requests the antenna velocity compensator 27 to cancel the compensation, based on the determination as the inappropriate data performed by the sensor information determining module 26b. The criterion of whether to suspend or cancel is determined beforehand based on, for example, how much the data is off or the frequency of the data being off, and is designed in the sensor information determining module 26b, etc.

Note that, a configuration may be adopted, in which even in the case where the compensation is suspended or canceled by the antenna velocity compensator 27, the absolute velocity is calculated by the absolute velocity calculator 28 through using the relative velocity of the target object 110 estimated by the velocity estimator 25.

Moreover, the sensor information determining module 26b may be configured to determine that the information acquired from the inclination sensor 30 is inappropriate in a different method. For example, the sensor information determining module 26b may be configured such that when many target objects 110 exist, the sensor information determining module 26b compares, between before and after the compensation performed by the antenna velocity compensator 27, the sum of absolute values of change amounts of the relative velocity of the respective target object 110 in every scan, and if the sum of the absolute values of the change amounts is larger with the compensation, the sensor information determining module 26b determines that the compensation is not performed properly. When the relative velocity Vr(k−1) at the measurement number k−1 is compared with the relative velocity Vr(k) at the measurement number k, Vr(k)−Vr(k−1) includes the change caused by the antenna velocity of the antenna 21 and an actual change ΔVr(k) of the relative velocity. Since the change caused by the antenna velocity of the antenna 21 becomes zero or approaches zero if the compensation is performed properly, when the absolute value of Vr(k)−Vr(k−1) is added for the many target objects 110, the absolute value becomes smaller before the compensation than after the compensation.

By suspending or canceling the compensation when the compensation of the velocity of the antenna becomes inappropriate as above, the error in the processing performed following the processing of the antenna velocity compensator 27 can be prevented from occurring due to the inappropriate compensation.

<Modification 3-1>

With the radar apparatus 20B of the third embodiment, the example of the case where the antenna velocity calculator 26B and the antenna velocity compensator 27 are configured with hardware is described; however, the functions of the antenna velocity calculator 26B and the antenna velocity compensator 27 may be achieved by software. In this case, at Step S13 of the velocity measuring method illustrated in FIG. 6, after the determination of whether the data of the roll angle and the pitch angle is appropriate is performed, the antenna velocity of the antenna 21 is calculated based on the changes of the roll angle and the pitch angle. Further, when the data is inappropriate, the compensation of the antenna velocity at Step S14 is suspended or canceled.

Fourth Embodiment

In the first embodiment, the example is described, in which the calculation is performed by considering that the position of the center of gravity 11 of the ship body 10 is known. However, the center of gravity 11 of the ship body 10 is not necessarily at the same position all the time. For example, in the ship body 10 of a cargo ship, the center of gravity 11 shifts lower when the load of cargo is large, and the center of gravity shifts higher if the load is small. Since the positional relationship between the antenna 21 and the center of gravity 11 may change as above due to a change of the draft of the ship, to perform the accurate compensation by the antenna velocity compensator 27, the relationship between the position of the center of gravity 11 and the position of the antenna 21 may need to be corrected. Moreover, in the case of inputting the positional relationship between the antenna 21 and the center of gravity 11 in initial setting, since the positional relationship between the center of gravity 11 and the antenna 21 is not easy to measure, the relationship between the antenna 21 and the center of gravity 11 may be difficult to specify.

Figure 10:
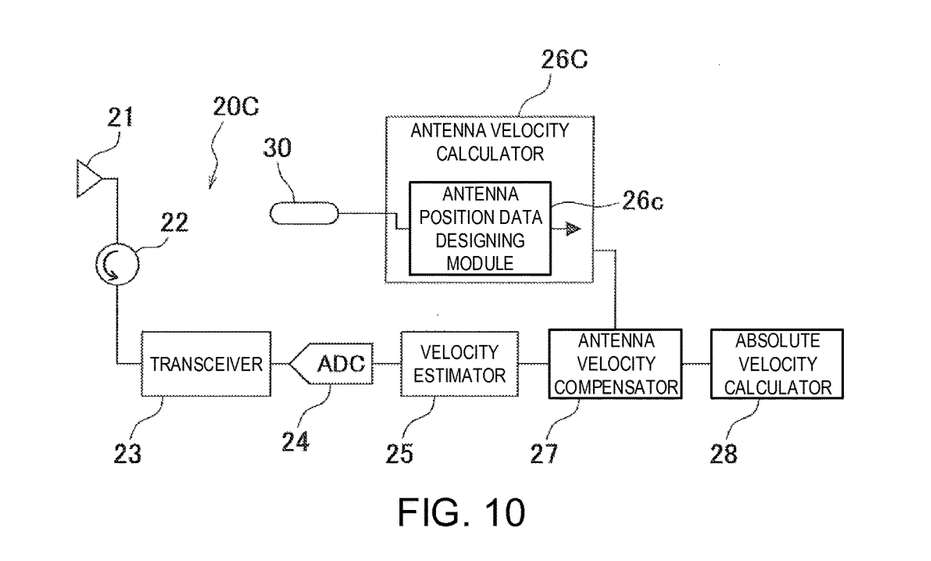
FIG. 10 is a block diagram illustrating a brief overview of a configuration of a ship radar apparatus according to a fourth embodiment.

Therefore, as illustrated in FIG. 10, a radar apparatus 20C according to a fourth embodiment of this disclosure includes an antenna position data designing module 26c in an antenna velocity calculator 26C. The antenna position data designing module 26c designs a few possible kinds of relationships between the position of the center of gravity 11 and the position of the antenna 21 and, from the few possible kinds of relationships, the antenna position data designing module 26c selects, as the suitable positional relationship, the relationship with the smallest change amount of the relative velocity before and after the compensation between scans. Thus, even without specifying the positions of the center of gravity 11 and the antenna 21 by measurement or the like, the positional relationship between the center of gravity 11 and the antenna 21 required for the calculations performed by the antenna velocity calculator 26 and the antenna velocity compensator 27 can be suitably designed.

<Modification 4-1>

With the radar apparatus 20C of the fourth embodiment, the example of the case where the antenna velocity calculator 26C and the antenna velocity compensator 27 are configured with hardware is described; however, the functions of the antenna velocity calculator 26C and the antenna velocity compensator 27 may be achieved by software. In this case, at Step S13 of the velocity measuring method illustrated in FIG. 6, a plurality of distances between the center of gravity 11 and the antenna 21 are designed and the calculation of the antenna velocity of the antenna 21 is performed. Further, also at Step S14, the compensation is performed by using a plurality of antenna velocities corresponding to the plurality of designed distances between the center of gravity 11 and the antenna 21. Then, among the few possible relationships, the relationship with the smallest change amount of the relative velocity before and after the compensation between scans is selected as the suitable positional relationship.

DESCRIPTION OF REFERENCE NUMERAL(S)

1 Ship body
20 Ship Radar Apparatus

21 Antenna
25 Velocity Estimator
26 Antenna Velocity Calculator
27 Antenna Velocity Compensator
30 Inclination Sensor

REFERENCE DOCUMENT(S) OF
CONVENTIONAL ART

Patent Document(S)

Patent Document 1: JPH05-333144A

What is claimed is:

1. A ship radar apparatus, comprising:
   an antenna installed on a ship body and configured to transceive electromagnetic waves;
   a sensor configured to detect a roll angle and a pitch angle of the ship body;
   processing circuitry configured:
      to calculate an antenna velocity that is a velocity of the antenna with respect to the ship body, by using inclination data generated from the detected roll and pitch angles of the ship body,
      to compensate the calculated antenna velocity, for a relative velocity between a specific target object and the ship body, the relative velocity obtained by using reflection waves received by the antenna,
      to determine whether the inclination data of the ship body is appropriate or inappropriate based on at least one of a cycle of rocking/drifting of the ship body and an inclination angle of the ship body, and
      to suspend or cancel compensation of the antenna velocity when the inclination data is inappropriate.

2. The ship radar apparatus of claim 1, wherein the processing circuitry is further configured to:
   interpolate data of an inclination of the antenna obtained based on the detected inclination of the ship body, and
   to calculate the antenna velocity.

3. The ship radar apparatus of claim 1, wherein the processing circuitry is further configured to calculate the antenna velocity by using a distance from the center of gravity of the ship body to the antenna.

4. The ship radar apparatus of claim 3, wherein the processing circuitry is further configured to calculate the antenna velocity by adjusting the distance from the center of gravity of the ship body to the antenna such that a difference between a largest value and a smallest value of the velocity of the specific target object when a predetermined number of scans are performed for the specific target object.

5. The ship radar apparatus of claim 1, wherein the processing circuitry is further configured:
   to estimate the relative velocity between the ship body and the specific target object in a predetermined direction by applying a self-correlation method on reception signals of the reflection waves of the specific target object, the reflection waves received by the antenna, and
   to perform the compensation of the antenna velocity, for the relative velocity.

6. The ship radar apparatus of claim 5, wherein the processing circuitry is further configured to obtain a ground velocity of the specific target object in the predetermined direction, by subtracting the velocity of the ship body from the relative velocity between the specific target object and the ship body after the compensation.

7. A method of measuring a velocity, comprising:
   detecting a roll angle and a pitch angle of a ship body;
   calculating an antenna velocity that is a velocity of an antenna with respect to the center of gravity of the ship body, by using inclination data generated from the detected roll and pitch angles of the ship body, the antenna being installed on the ship body; and
   compensating the calculated antenna velocity, on the basis of a relative velocity between the ship body and the target which is obtained by using reflection waves received by the antenna
   determining whether the inclination data of the ship body is appropriate or inappropriate based on at least one of a cycle of rocking/drifting of the ship body and an inclination angle of the ship body, and
   suspending or canceling compensation of the antenna velocity when the inclination data is inappropriate.

* * * * *